United States Patent [19]
Jochum

[11] 3,805,744
[45] Apr. 23, 1974

[54] APPARATUS FOR CATCHING AND CRATING POULTRY

[76] Inventor: Enos R. Jochum, Rt. No. 4, Hanceville, Ala. 35077

[22] Filed: Dec. 26, 1972

[21] Appl. No.: 318,029

[52] U.S. Cl.............................. 119/82, 56/345
[51] Int. Cl............................................ A01k 29/00
[58] Field of Search ............... 119/82; 56/345, 119; 198/165

[56] References Cited
UNITED STATES PATENTS
2,753,676  7/1956  Collins................................ 56/345
3,672,335  6/1972  Sanders................................ 119/82
3,389,780  6/1968  Jerome.............................. 119/82 X Primary Examiner—Robert Peshock
Assistant Examiner—J. N. Eskovitz
Attorney, Agent, or Firm—Jennings, Carter & Thompson

[57] ABSTRACT

An endless drive member passing around the forward and rear ends of a translatable frame carry laterally projecting, poultry conveying scoops positioned at longitudinally spaced intervals. The scoops pass through an enclosure alongside the rearwardly moving flight of the endless drive member with the rear end of the enclosure terminating in a discharge passageway that delivers poultry to a crate.

10 Claims, 6 Drawing Figures

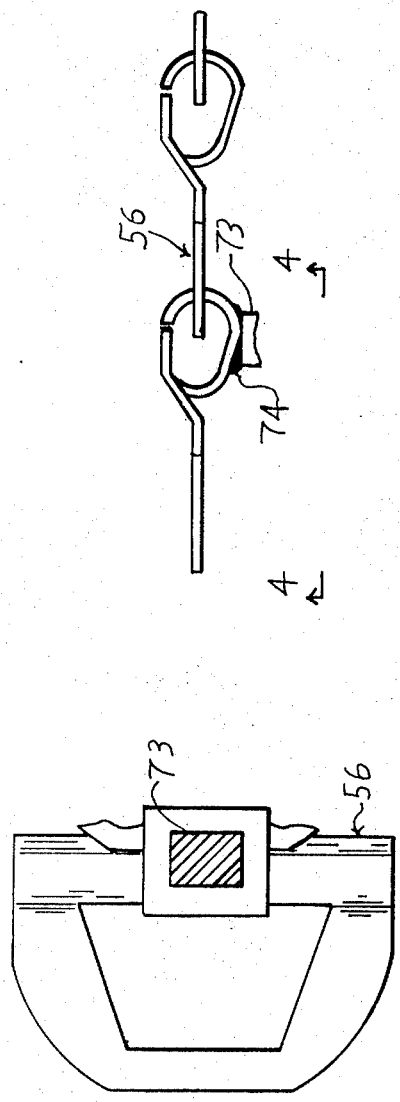
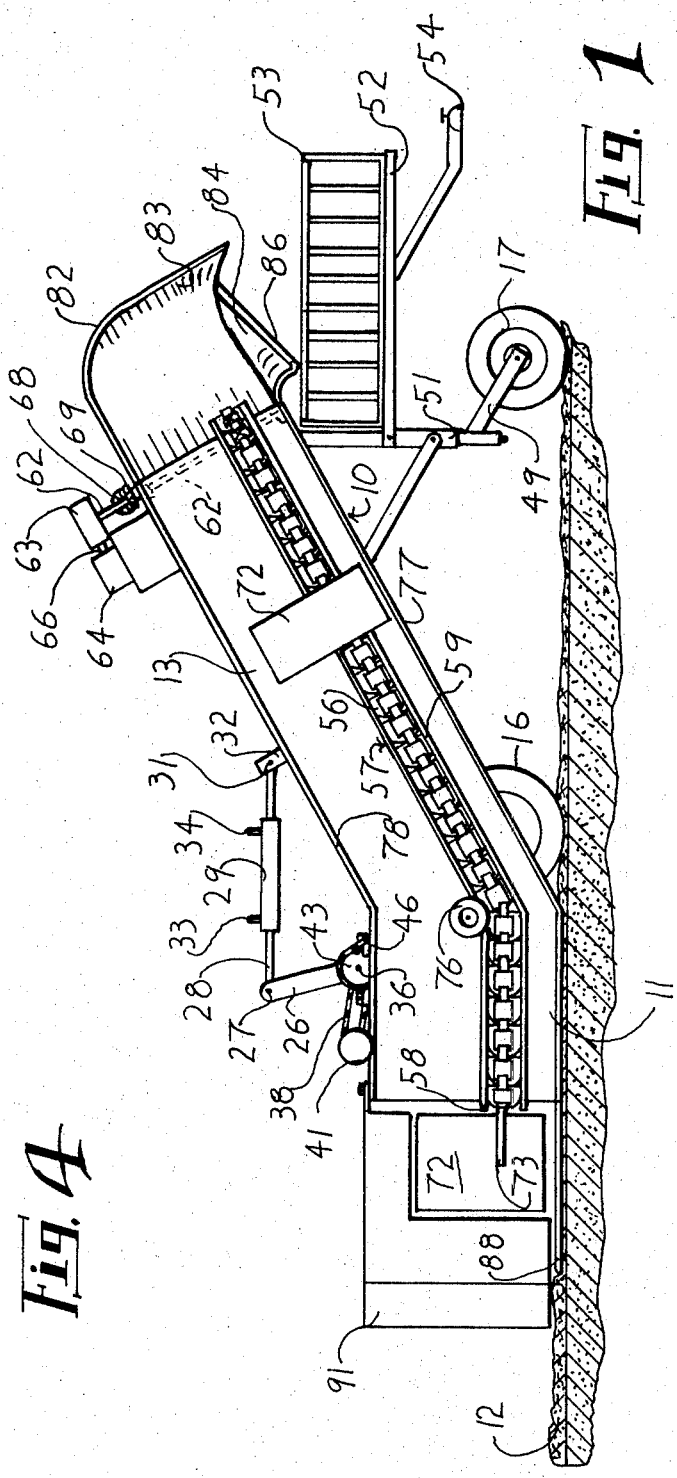

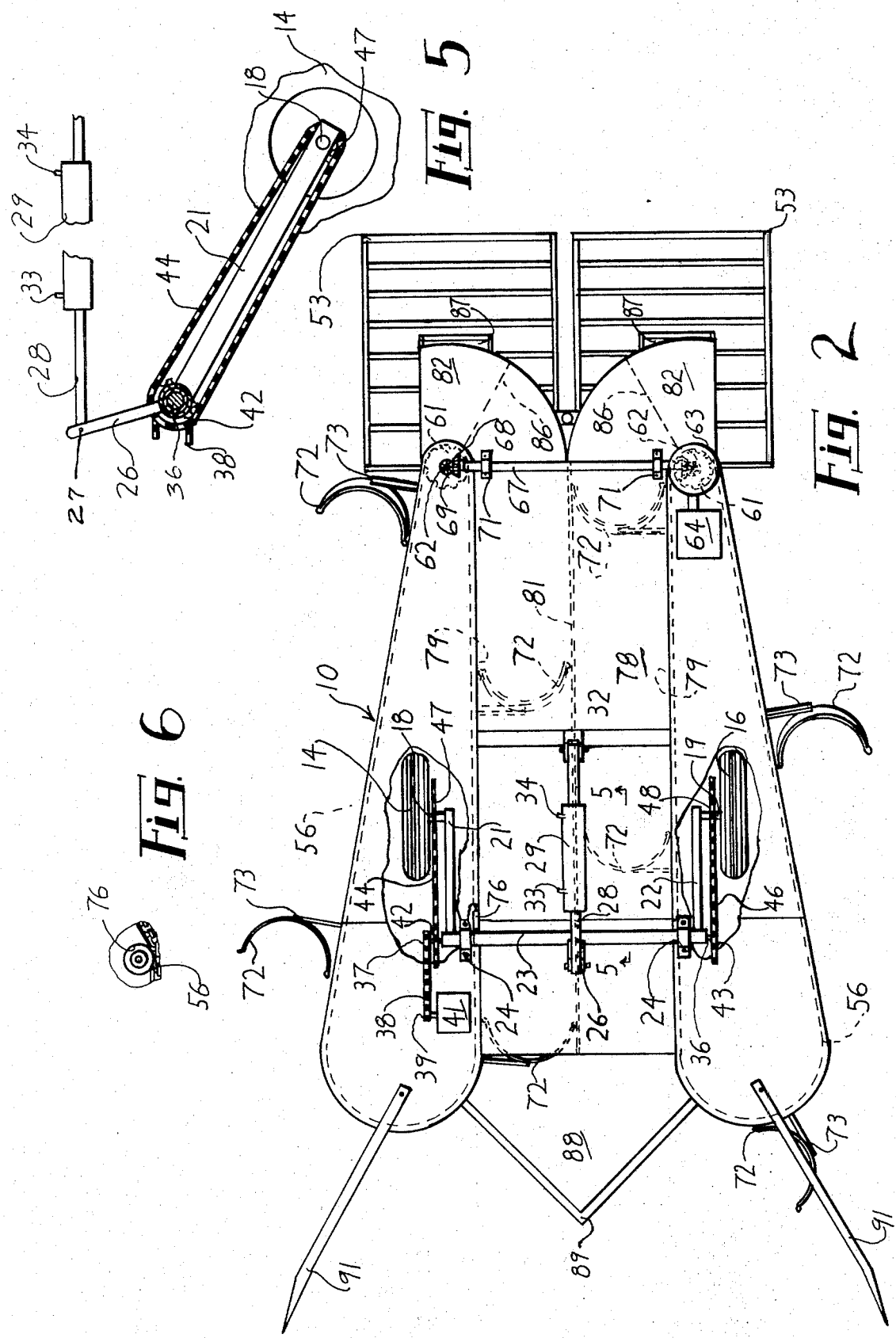

APPARATUS FOR CATCHING AND CRATING POULTRY

BACKGROUND OF THE INVENTION

This invention relates to apparatus for catching and crating poultry and more particularly to apparatus for catching and crating live chickens, turkeys and the like from pens or poultry houses.

As is well known in the art to which my invention relates, the poultry industry has grown rapidly and many devices have been proposed for reducing the amount of labor required in the production of poultry. However, no effective means has been devised for catching and crating live poultry from pens or other areas where they have been raised. Accordingly, the catching of large flocks of birds, such as several thousand at a time, is time consuming and costly. This is especially true in view of the fact that poultry, such as chickens, are very fractious creacures and it is very easy for them to injure themself or be injured by the man handling the birds as they are being caught. Usually, birds are caught by hand and then placed into coops or the birds are driven by means of loud noises to a restraining or hemming device where the birds are placed by hand into suitable apparatus for placing the birds in coops. Accordingly, the birds are caught by human hands or by herding or driving them into a restraining or hemming device.

BRIEF SUMMARY OF THE INVENTION

In accordance with my invention, I provide an endless drive member which passes around the forward and rear ends of a portable frame. Laterally projecting poultry conveying scoops are positioned at longitudinally spaced interval and the scoops pass through an enclosure along the rearwardly moving flight of the endless drive member with the rear end of the enclosure terminating in a discharge passageway that delivers the poultry to a crate.

An object of my invention is to provide self-contained apparatus which will enable poultry to be caught without the necessity of manually handling the birds and without having to herd or drive the live poultry into restraining devices which frequently bruise, damage or smother the birds by means of frustration or suffocation. Accordingly, I provide a more humane handling of the poultry and at the same time eliminate damage to the poultry house equipment which is sometimes caused by the birds being driven into panic or frustration by means of driving or herding procedures presently employed. A further object of my invention is to provide poultry handling apparatus which enables the birds to be caught in daytime as well as night and also to provide apparatus which may be easily transported from house to house or from farm to farm.

BRIEF DESCRIPTION OF DRAWINGS

Apparatus embodying features of my invention is illustrated in the accompanying drawings, forming a part of this application, in which:

FIG. 1 is a side elevational view of my apparatus;

FIG. 2 is a top plan view of the apparatus shown in FIG. 1, parts being broken away;

FIG. 3 is an enlarged, fragmental view showing a portion of the endless drive chain which carries poultry conveying scoops;

FIG. 4 is a fragmental view taken generally along the line 4—4 of FIG. 3;

FIG. 5 is an enlarged, fragmental, sectional view taken generally along the line 5—5 of FIG. 2; and, FIG. 6 is a fragmental view showing one of the idler rollers mounted on the inside of the frame to permit bending of the drive chain.

Referring now to the drawings for a better understanding of my invention, I show a translatable frame 10 having a horizontal forward portion 11 adapted to move adjacent a supporting surface 12, such as a layer of sawdust or other fibrous material. That is, in poultry houses it is the usual practice to place a layer of fibrous material, such as sawdust, over the subjacent supporting surface. As shown in FIG. 1, the translatable frame 10 has an upwardly and rearwardly extending portion 13 which terminates at an elevation above the supporting surface 12. The frame 10 is supported by wheels 14 and 16 and a rear caster wheel 17.

The wheels 14 and 16 are mounted on rotatable stub shafts 18 and 19, respectively, which are supported by suitable bearings carried by elongated support members 21 and 22, respectively. The upper ends of the members 21 and 22 are secured rigidly to an elongated, hollow shaft 23 which extends transversely of the frame 10, as shown in FIG. 2. The hollow shaft 23 is mounted for rotation in suitable bearings 24 carried by the frame 10. The lower end of an upstanding arm 26 is secured rigidly to the central portion of the hollow shaft 23. The upper end of the arm 26 is pivotally connected by a pivot pin 27 to the piston rod 28 of a fluid pressure operated cylinder 29 which in turn is pivotally connected by a pivot pin 31 to a support bracket 32 carried by the frame 10. Fluid under pressure is introduced into opposite ends of the cylinder 29 by suitable conduits 33 and 34. Accordingly, upon actuation of the fluid pressure operated cylinder 29, the arm 26 is moved to selected angular positions to thus raise and lower the translatable frame 10 relative to the supporting wheels 14 and 16 whereby the frames 10 assumes the position shown in FIG. 1 while in the process of catching poultry and is adapted to move to an elevated position for transporting the apparatus from one location to another.

Mounted for rotation within the hollow shaft 23 is a shaft 36 which carries a sprocket 37 at one end thereof. The sprocket 37 is driven by a sprocket chain 38 which passes around a sprocket 39 carried by a motor 41. Sprockets 42 and 43 are mounted on the shaft 36 adjacent each end of the hollow shaft 23. Passing around the sprockets 42 and 43 are sprocket chains 44 and 46, respectively, which also pass around sprockets 47 and 48 carried by the stub shafts 18 and 19, respectively.

The rear caster wheel 17 is carried by a supporting structure 49 which is adapted for pivotal movement relative to a depending, bearing sleeve-like member 51 whereby the caster wheel 17 is adapted for free pivotal movement to permit steering of the frame 10 in any desired direction. Secured to the bearing sleeve member 51 is a rearwardly extending supporting frame 52 for supporting a coop or crate 53 for receiving poultry in a manner to be described hereinafter. The supporting frame 52 carries a trailer hitch unit indicated generally at 54 whereby the apparatus may be attached to a suitable vehicle for pulling the frame 10 to selected locations, such as from house to house or from farm to farm.

Mounted adjacent each side of the frame 10 is an elongated poultry catching and conveying unit which comprises an endless drive member 56, such as a drive chain, which passes around the forward portion 11 and the rear portion 13 of the frame 10 and rides in a trackway 57 having upper and lower guide members 58 and 59, respectively whereby the drive chain is retained in a generally upright position as it passes around said forward portion and said rear portion. The forward portion of each trackway 57 is arcuate at the forward end of the frame 10 to provide semi-circular guide members. Each drive chain 56 is driven by a drive sprocket 61 which is carried by an upstanding shaft 62. The upper end of one of the vertical shafts 62 is operatively connected to a speed reducer 63 which in turn is connected to a motor 64 by a shaft 66. The other upstanding shaft 62 is operatively connected to the shaft 62 which is connected to the reducer 63 by a transverse shaft 67 having a beveled gear 68 at each end thereof. Each upstanding shaft 62 carries a beveled gear 69 which meshes with the adjacent beveled gear 68 whereby the outermost flights of the chain drives 56 move forwardly and the innermost flights thereof move rearwardly of the frame 10. The transverse shaft 67 is supported for rotation in suitable bearings 71 carried by the frame 10.

Secured to and projecting laterally from each of the endless drive members 56 are a plurality of scoop-like members 72 which are located at longitudinally spaced intervals, as shown. Each scoop-like member 72 comprises an arcuate plate-like member with the forward surface thereof being concave, as shown. Preferably, the scoop-like members 72 are carried by laterally projecting support members 73 which are secured rigidly to the endless drive chain 56 by suitable means, such as by welding at 74 whereby the scoop-like members remain in a generally upright position.

Mounted on the frame 10 adjacent each flight of the endless drive chain 56 at the point of juncture between the forwardly extending portion 11 and the upwardly and rearwardly extending portion 13 is an idler roller 76, as clearly shown in FIGS. 1 and 6. The idler roller 76 eliminates drag and allows the endless drive chains 56 to bend as it passes from the upwardly and rearwardly extending portion 13 to the forwardly extending portion 11 or passes from the forwardly extending portion 11 to the upwardly and rearwardly extending portion 13, as the case may be.

The frame 10 is provided with a bottom wall 77 and a top wall 78 to provide an enclosure 79 alongside the rearwardly moving flight of each endless drive member 56. As shown in FIG. 2, a vertical partition 81 is provided between adjacent enclosures 79 whereby each enclosure 79 is of a size to receive the scoop-like members 72 with a relatively close fit to move poultry toward the rear end of the frame. Each enclosure 79 is thus in the form of an elongated tunnel-like member which extends from a point adjacent the forward end of the frame 10 to the upper end thereof.

The upper rear end of each enclosure 79 terminates in a laterally extending portion 82 to provide a laterally disposed discharge opening 83. Each discharge opening 83 is provided with a downwardly inclined bottom wall 84 which terminates as at 86 to provide a downwardly sloping discharge chute for conveying the poultry into the open door 87 of the crate 53.

Secured to the lower, forward end of the forwardly extending portion 11 of frame 10 is a horizontal shovel-like member 88 which is at an elevation to move adjacent or slightly below the upper surface of the fibrous material 12 whereby there is no injury to the feet of the birds being caught. Preferably, the forward end of the shovel-like member 88 terminates in a point 89, as shown in FIG. 2. Also, to facilitate movement of the poultry into the forward end of the enclosure 79, I provide forwardly and outwardly extending skirt-like members 91 which direct the birds inwardly toward the shovel-like member 88.

From the foregoing description, the operation of my improved apparatus for catching and crating poultry will be readily understood. To transport the apparatus to various locations, the fluid pressure operated cylinder 29 is actuated to raise the frame 10 relative to the supporting wheels 14 and 16 whereby the forwardly extending portion 11 is supported at a substantial elevation above the supporting surface therefor. To place the apparatus in position to catch birds, the cylinder 29 is actuated to lower the frame 10 to the position shown in FIG. 1 whereby the shovel-like member 88 moves adjacent or slightly below the surface of the fibrous material 12. The motor 64 drives the sprockets 61 and the endless chain drives 56 in a direction for the innermost flights of the chains 56 to move rearwardly and parallel to each other through the parallel enclosures 79 toward the discharge opening 83. As the concave, forward surfaces of the scoop-like members engage the birds, they move the birds into the forward ends of the parallel enclosures 79 and then cause the birds to move through the enclosure 79 to the discharge end 83 whereupon the birds move down the downwardly inclined chute 84 into the open doors 87 of the crates 53. The frame 10 is steered by pivoting the caster wheel 17 to selected positions whereby the frame may be moved in any desired direction. When it is desired to transport the apparatus to another location, such as another farm, the trailer hitch 54 is attached to a conventional towing vehicle.

From the foregoing, it will be seen that I have devised improved apparatus for catching and crating poultry. By providing self-contained apparatus which does not require man-handling of the birds, the birds are not frightened and injured as they are moved gently toward the discharge end of the tunnel-like enclosures and then deposited in the crates. Also, by providing apparatus which also directs the birds into the enclosures without having to frighten the birds into the vicinity of the enclosures, the birds are not driven into panic or frustration. Furthermore, by providing apparatus which is extremely simple of construction, economical of manufacture and which is portable from house to house or farm to farm, the cost of catching and crating birds is greatly reduced and at the same time the birds may be caught in daytime as well as at nighttime.

While I have shown my invention in but one form, it will be obvious to those skilled in the art that it is not so limited, but is susceptible of various other changes and modifications without departing from the spirit thereof.

What I claim is:

1. Apparatus for catching and crating poultry comprising:
    a. a translatable frame having a generally horizontal forward portion disposed to move adjacent a supporting surface and an upwardly and rearwardly extending portion,
    b. at least one endless drive member passing around said forward portion and said rear portion with guide means retaining said drive member in a generally upright position, c. means to move said endless drive member around said forward and rear portions with one flight moving forward and the other flight moving rearward, d. scoop-like members carried by and extending laterally from said endless drive member at longitudinally spaced intervals with each scoop-like member extending in a generally upright position, e. means defining an enclosure alongside the rearward moving flight of said endless drive member of a size to receive said scoop-like members and move poultry toward the rear end of said rearwardly extending portion, and f. a discharge passageway adjacent said rear end of said rearwardly extending portion for discharging poultry into a crate.

2. Apparatus for catching and crating poultry as defined in claim 1 in which said rearwardly extending portion extends upwardly and rearwardly with said discharge passageway being in vertically spaced relation to said supporting surface.

3. Apparatus for catching and crating poultry as defined in claim 2 in which a crate support member is carried by said frame in position to support a crate subjacent said discharge passageway.

4. Apparatus for catching and crating poultry as defined in claim 1 in which means is carried by the forward portion of said frame for directing poultry into the forward end of said enclosure.

5. Apparatus for catching and crating poultry as defined in claim 1 in which a generally horizontal shovel-like member is carried by the forward end of said forward portion and is disposed to move subjacent said supporting surface.

6. Apparatus for catching and crating poultry as defined in claim 1 in which said endless drive member is an endless chain mounted for movement in a trackway carried by said frame and passing around a power drive sprocket.

7. Apparatus for catching and crating poultry as defined in claim 1 in which said scoop-like members are arcuate plate-like members with the forward surfaces thereof being concave.

8. Apparatus for catching and crating poultry as defined in claim 1 in which said rearwardly extending portion terminates in a downwardly extending chute adjacent said discharge passageway.

9. Apparatus for catching and crating poultry as defined in claim 1 in which said translatable frame comprises two of said endless drive members with the rearward moving flights thereof extending generally parallel to each other and being inwardly of said forward moving flights.

10. Apparatus for catching and crating poultry as defined in claim 1 in which said forward portion of said frame is supported by adjustable wheel units and the rear portion of said frame is supported by a caster wheel unit for steering said frame.

* * * * *